(12) United States Patent
Mejia

(10) Patent No.: US 7,423,954 B2
(45) Date of Patent: Sep. 9, 2008

(54) CONTACT PROBE STORAGE SENSOR POD

(75) Inventor: Robert G. Mejia, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 10/736,753

(22) Filed: Dec. 17, 2003

(65) Prior Publication Data

US 2005/0135203 A1     Jun. 23, 2005

(51) Int. Cl.
*G11B 9/00*     (2006.01)

(52) U.S. Cl. .................... 369/126; 702/168

(58) Field of Classification Search .............. None
See application file for complete search history.

(56) References Cited

U.S. PATENT DOCUMENTS

| | | | |
|---|---|---|---|
| 3,842,194 A | 10/1974 | Clemens |
| 3,920,930 A | 11/1975 | Sobczyk |
| 4,340,956 A | 7/1982 | Miller |
| 4,450,550 A | 5/1984 | Sterzer |
| 4,912,822 A | 4/1990 | Zdeblick et al. |
| 4,998,016 A | 3/1991 | Nose et al. |
| 5,015,850 A | 5/1991 | Zdeblick et al. |
| 5,053,995 A | 10/1991 | Kajimura et al. |
| 5,138,174 A | 8/1992 | Tang |
| 5,235,187 A | 8/1993 | Arney et al. |
| 5,283,437 A | 2/1994 | Greschner et al. |
| 5,289,004 A | 2/1994 | Okada et al. |
| 5,329,513 A | 7/1994 | Nose et al. |
| 5,345,815 A | 9/1994 | Albrecht et al. |
| 5,371,728 A | 12/1994 | Sakai et al. |
| 5,373,494 A | 12/1994 | Kawagishi et al. |
| 5,398,299 A | 3/1995 | Nakayama et al. |
| 5,412,641 A | 5/1995 | Shinjo et al. |
| 5,426,631 A | 6/1995 | Miyazaki et al. |
| 5,526,334 A | 6/1996 | Yamano et al. |
| 5,537,372 A | 7/1996 | Albrecht et al. |
| 5,546,374 A | 8/1996 | Kuroda et al. |
| 5,583,286 A | 12/1996 | Matsuyama |
| 5,610,898 A * | 3/1997 | Takimoto et al. ............ 369/126 |
| 5,679,952 A | 10/1997 | Lutwyche et al. |
| 5,680,387 A | 10/1997 | Yamano et al. |

(Continued)

FOREIGN PATENT DOCUMENTS

DE     10155930     5/2003

(Continued)

OTHER PUBLICATIONS

Presentation, 02 Field-Effect Transistor (FET) principles and types.

(Continued)

*Primary Examiner*—Joseph Feild
*Assistant Examiner*—Tawfik Goma

(57) ABSTRACT

An embodiment of a read mechanism used in a contact atomic resolution storage system, has a cantilever disposed with a medium which is movable relative to the cantilever. The cantilever has a probe which extends from the cantilever and which contacts a surface of the medium. A pod is formed on a side of the cantilever facing the medium and extends toward the media. A sensor element is formed on the pod so as to juxtapose the medium.

20 Claims, 3 Drawing Sheets

U.S. PATENT DOCUMENTS

| | | | |
|---|---|---|---|
| 5,751,683 A | 5/1998 | Kley | |
| 5,751,685 A | 5/1998 | Yi | |
| 5,753,911 A | 5/1998 | Yasuda et al. | |
| 5,856,672 A | 1/1999 | Ried | |
| 5,883,705 A | 3/1999 | Minne et al. | |
| 5,953,306 A | 9/1999 | Yi | |
| 5,969,345 A | 10/1999 | Williams et al. | |
| 5,994,698 A | 11/1999 | Kawade et al. | |
| 6,072,764 A | 6/2000 | Shido et al. | |
| 6,218,086 B1 | 4/2001 | Binnig et al. | |
| 6,249,747 B1 * | 6/2001 | Binnig et al. | 702/33 |
| 6,337,477 B1 | 1/2002 | Shimada et al. | |
| 6,369,385 B1 | 4/2002 | Muray et al. | |
| 6,401,526 B1 | 6/2002 | Dai et al. | |
| 6,436,794 B1 | 8/2002 | Lee et al. | |
| 6,440,820 B1 | 8/2002 | Lee et al. | |
| 6,465,782 B1 | 10/2002 | Kendall | |
| 6,477,132 B1 | 11/2002 | Azuma et al. | |
| 6,515,957 B1 | 2/2003 | Newns et al. | |
| 6,580,678 B2 | 6/2003 | Kondo et al. | |
| 6,703,258 B2 * | 3/2004 | Hopson et al. | 438/52 |

FOREIGN PATENT DOCUMENTS

| | | |
|---|---|---|
| EP | 0 984 444 | 3/2000 |
| EP | 1 227 496 | 7/2002 |

OTHER PUBLICATIONS

P. Vettiger, et al., "The Millipede—More than one thousand tips for future AFM data storage", May 3, 2000, IBM J. Res. Develop. vol. 44:3.

Chuck Morehouse, "Beyond Magnetic Recording—Will it be probe-based storage", IIST Workshop XVI Lake Arrowhead, Oct. 2000, IIST WS XVI, Hewlett-Packard Laboratories.

* cited by examiner

CONTACT PROBE STORAGE SENSOR POD

BACKGROUND OF THE INVENTION

The present invention relates generally to a Contact Probe Storage System (CPS) arrangement and more specifically to a sensor arrangement for use with a CPS which exhibits improved response.

It has been hitherto been proposed to sense data which is written onto a movable medium using a probe that is supported on a cantilever and used to contact the medium. By using heat transfer characteristics between the movable medium and the probe (or a portion of the cantilever), it is possible to determine minute changes in distance between the movable medium and the cantilever on which the probe is carried, and use this as a means for reading out the data stored on the movable medium.

In the above type of arrangement, both imaging and reading are carried out using a thermomechanical sensing concept. The heater in the cantilever that is used only for writing is also used as a thermal readback sensor by exploiting a temperature-dependent resistance function. That is to say, in this type of arrangement, the resistance (R) increases nonlinearly with heating power/temperature from room temperature to a peak value of 500-700° C. The peak temperature is determined by the doping concentration in the heater platform, which ranges from $1\times10^{17}$ to $2\times10^{18}$. Above the peak temperature, the resistance drops as the number of intrinsic carriers increases because of thermal excitation.

For sensing, the resistor is operated at about 200° C. This temperature is not high enough to soften the polymer, as is necessary for writing, but allows the molecular energy between the cantilever on which the probe is carried, and the moving medium, to remove heat and thus provide a parameter which allows the distance between the cantilever on which the probe is carried and the medium on which the probe is running to be measured.

That is to say, this thermal sensing is based on the fact that the thermal conductance between the heater platform and the storage substrate changes according to the distance between them. The medium between a cantilever and the storage substrate, in this case air, transports heat from the heater/cantilever to the storage/substrate. When the distance between heater and sample is reduced as the probe moves into a bit indentation, heat is more efficiently transported through the air and the heater's temperature and hence its resistance decreases. Thus, changes in temperature of the continuously heated resistor are monitored while the cantilever is scanned over data bits, providing a means of detecting the bits.

Under typical operating conditions, the sensitivity of the thermomechanical sensing is even better than that of piezoresistive-strain sensing inasmuch as thermal effects in semiconductors are stronger than strain effects. A $\Delta R/R$ sensitivity of about $10^{-4}$/nm is demonstrated by the images of the 40-nm-size bit indentations using the thermomechanical sensing. This is better than the results are obtained using the piezoresistive-strain sensing technique.

Nevertheless, the thermal response has been found to be slower than desired and is significantly slower than the cantilever's ability to mechanically follow the data pattern written in the medium. This leads to the system's read performance being slower than it would be if it were not limited to the thermal response of the sensing system.

DETAILED DESCRIPTION OF THE EXEMPLARY EMBODIMENTS

Figure 1:
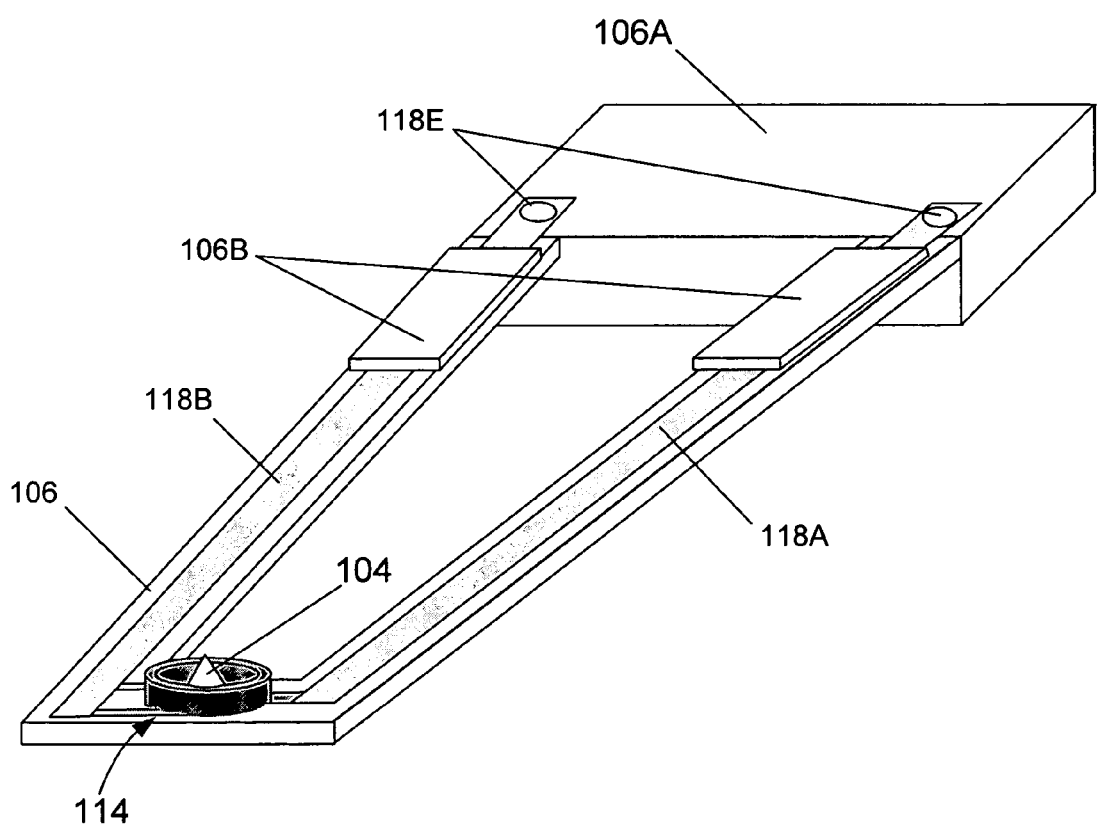
FIG. 1 is a schematic perspective view showing a cantilever having a sensor pod arrangement according to the embodiments of the invention.
Figure 2:
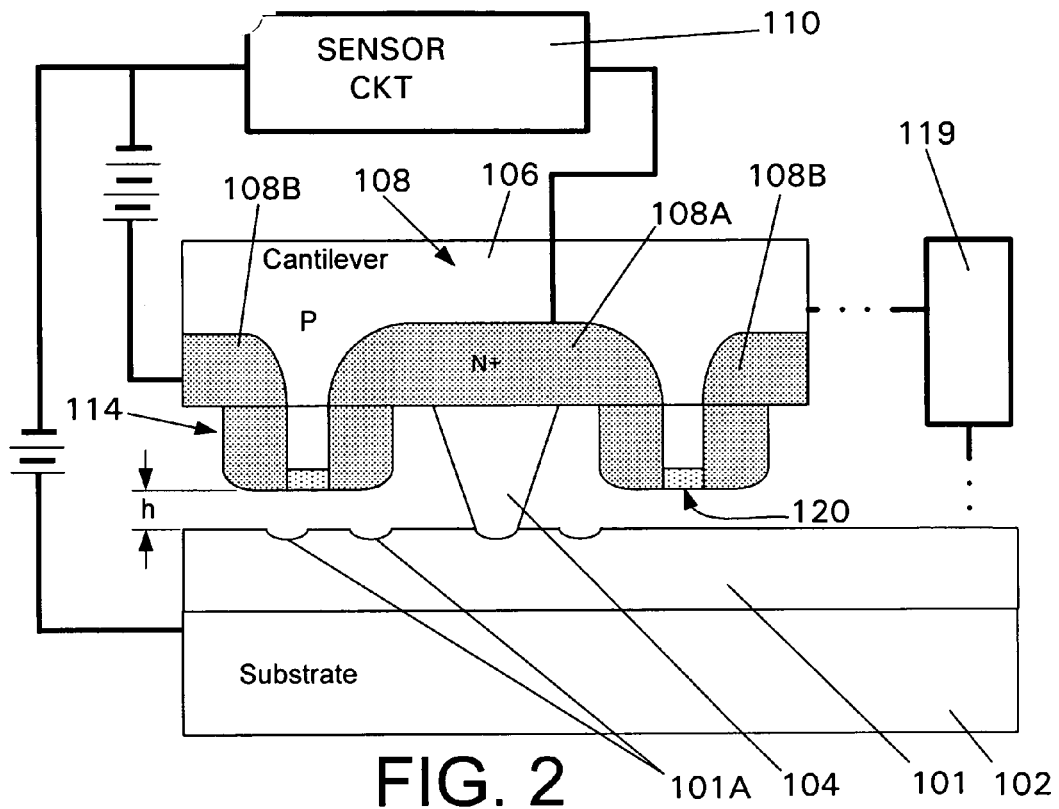
FIG. 2 is a schematic sectional view taken along section line II-II of FIG. 3 showing a FET sensor arrangement according to a first embodiment of the invention.
Figure 3:
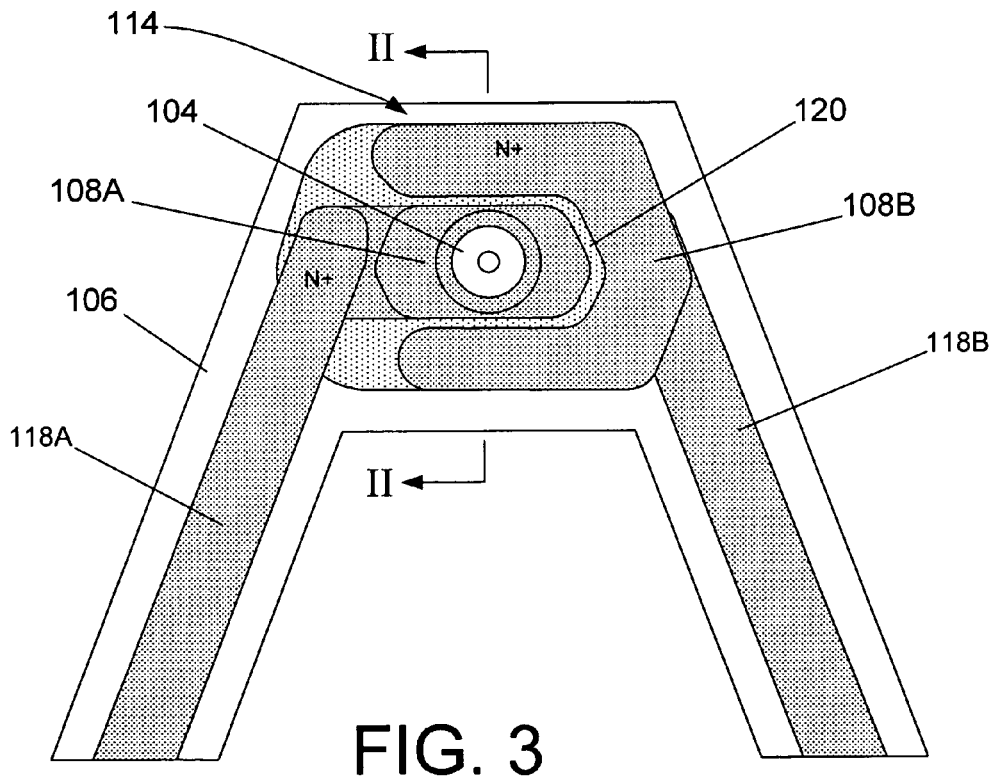
FIG. 3 is a schematic plan view as seen from the probe side of the cantilever arrangement shown in FIG. 2.

FIGS. 1-3 show a first embodiment of the invention. FIG. 2 shows a suitable medium 101 such as a layer of polycarbonate or polymethylmethacrylate (PMMA) for example, which is formed over the surface of a suitable support substrate 102. The media 101, which in this case is non-conductive, has been heated (for example) locally to write data by forming a change in medium topography which can be detected by lowering a probe 104, which is formed at the end of the cantilever 106 in the manner depicted in FIG. 1, onto the medium.

Although the topography is shown as comprising a series of data recesses or pits 101A, these can be replaced with humps (not shown) or a combination of pits and humps. However, it should be noted that these humps (if used) should be isolated from the pits so as not to be not confused with the raised ring that tends to form around the mouth of the pits like a lunar impact crater.

Thus, when the medium 101 or the cantilever 106 has been moved relative to the other to assume an exact coordinate relationship, the cantilever 106 can be moved toward the medium 101. In the event that a pit 101A (or isolated hump) is located under the probe 104, the entry of the probe into the pit (or engagement with the top of the hump) indicates the presence of a data bit. Should the probe 104 not find a pit or a hump and seat on the flat surface of the medium then an absence of a data bit is indicated.

Additionally, the bits may be coded such that a particular change from one state (pit, hump or flat surface) to another state would indicate a bit and other states or changes would indicate the lack of a bit. The invention can use other coding techniques employed in contact storage device detection patterns or other responses that are predominant in the response of the sensor-media systems.

The topography of the medium 101 is thus such that the distance or air gap between the medium 101 and a cantilever 106 on which the probe 104 is formed, varies. This distance variation allows an FET (field effect transistor) 108, which is formed in the end of the cantilever 106 proximate the probe 104, to respond to changes in an electric field which is generated between the substrate 102 and the cantilever 106 and thus modulate a signal in the form of a current which passes through the FET 108 in accordance with the amount of clearance between the medium 101 and the cantilever 106.

A sensor circuit 110 is arranged to be responsive to the change in current passing through the FET 108 and thus detect the change in distance between the cantilever 106 and the medium 101.

A sensor support extension or "pod" 114 is formed in a manner which, in this embodiment, surrounds the probe 104. As shown in FIG. 3, the pod 114 has a face oriented toward the medium 101 and has at least portions of the source 108A and drain 108B of the FET formed therein. This brings the FET closer to the substrate 102 which interacts with the FET to generate the electric field. The FET, in the illustrated embodiment, is a depletion mode FET which includes a channel 120 that is formed in the face of the pod 114 juxtaposed the medium 101.

In this first embodiment, the source, drain and substrate 102 are circuited as schematically illustrated in FIG. 2, so as to develop a bias voltage between the source and drain of the FET 108 and the medium 101. This induces the situation where the proximity of the substrate 102 effectively gates the FET 108 and modulates the amount of current which is permitted to flow from the source to the drain through the channel which is interconnects the two.

Since the pod 114 brings the elements of the FET 108 closer to the surface of the media 101 and reduces the distance from the substrate 102, the sensor's response characteristics are improved. That is to say, with the provision of the pod 114, not only is the FET exposed to a more intense electric field, but the relative change in distance "h" between the FET and the media 101 (Δh/h) which occurs in the event that the probe 104 enters a recesses formed in the medium 101, is increased.

Figure 4:
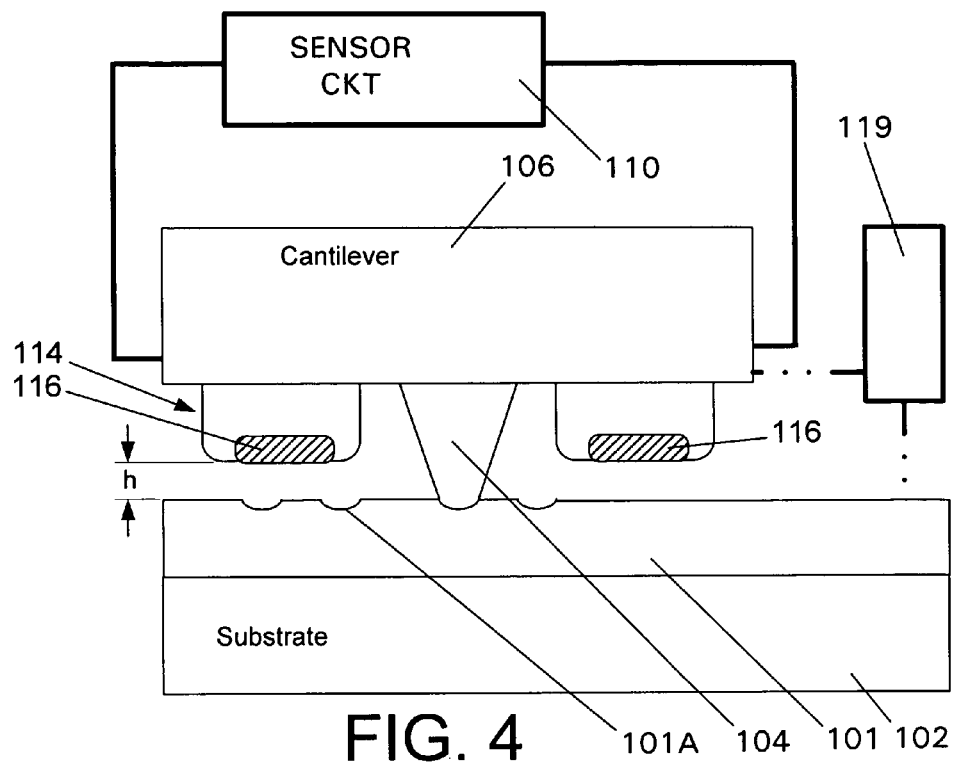
FIG. 4 is a schematic sectional side view of a second embodiment of the invention as taken along section line IV-IV of FIG. 5.

In the embodiment illustrated in FIGS. 1-3, the medium 101 and the cantilever 106 are operatively (mechanically) connected so that medium 101 is selectively movable with respect to the cantilever 106 by way of a drive mechanism denoted by numeral 119 (schematically depicted in FIGS. 2 and 4). This mechanism 119 is arranged to move the two elements (viz., the cantilever 106 and the medium 101) with respect to one another to as to assume a selected coordinate relationship and position the probe 104 so that it can detect if a data indicative change in topography (e.g. a pit 101A) is present or absent at that set of coordinates.

A variant of the above embodiment uses an induced-channel type FET. Unlike the depletion mode, this induced-channel or enhancement mode FET is such that there is no intrinsic channel and the drain to source conductance is very low until the gate voltage is applied. When the gate voltage exceeds a given threshold, enough carriers are pulled into the channel region that the device starts to conduct. In an N-channel enhancement type FET, the channel is p-type material that forms a conduction band when sufficiently positive gate voltage is applied. When conducting, the channel behaves like n-type material.

Thus, this alternative induced-channel FET conducts current from source to drain in response to the electric field that is created when a voltage is applied to the gate (viz., the substrate 102) and a channel being induced by the migration of free electrons. As in the case of depletion mode FET, the gate signal determines the amount of current flow through the channel as long as the source and drain voltages remain constant. When the gate voltage is at zero, essentially no current flows since a gate voltage is required to form a channel.

Since either one or both of the probe 104 and the medium 101 are electrically non-conductive surface, the modulation of the current passing through the FET 108 is due solely to the changes in the electrical field which are produced between the cantilever 106 and the substrate 102. The substrate 102, of course, must be sufficiently conductive to allow for the required electrical field to be established.

The cantilever 106 is etched out of silicon and, as shown in FIG. 1, extends from a base block 106A and is provided with layers of cantilever activation material 106B which are formed of intrinsically stressed material and which are used to induce flexure in the cantilever 106 and move the probe 104 with respect to the medium 101. The terminal ends of the doped traces 118A and 118B are located on the base block 106A and a provided with electrical contacts 118E. The activation material 106B, however, is not limited to the use of intrinsically stressed material and can be alternatively formed of a piezoelectric material if so desired.

Inasmuch as doping and etching techniques are well within the purview of the person skilled in the art of semiconductor fabrication, no description of this aspect will be given for brevity.

Through the use of a FET as a sensor, a good sensor bandwidth can be expected inasmuch as the electric field responds as fast as the cantilever can move. The FET is thus able to respond quickly to the variations in field strength and has the potential to make the mechanics of the cantilever the limiting factor in the bandwidth. The signal to noise (SNR) for this arrangement can be expected to be improved as compared to the above-mentioned thermal type sensor in that, with the latter, much of the signal is filtered out by the thermal lowpass function. The provision of the pod 114 improves these characteristics.

Since the FET is capable of producing gain, the sensor can be expected to produces a relatively large output signal with respect to the various noise sources and thus reduce signal degradation due to these noises. The SNR of the sensor will be improved since the relative change in distance (Δh/h) will be larger as noted above.

Figure 5:
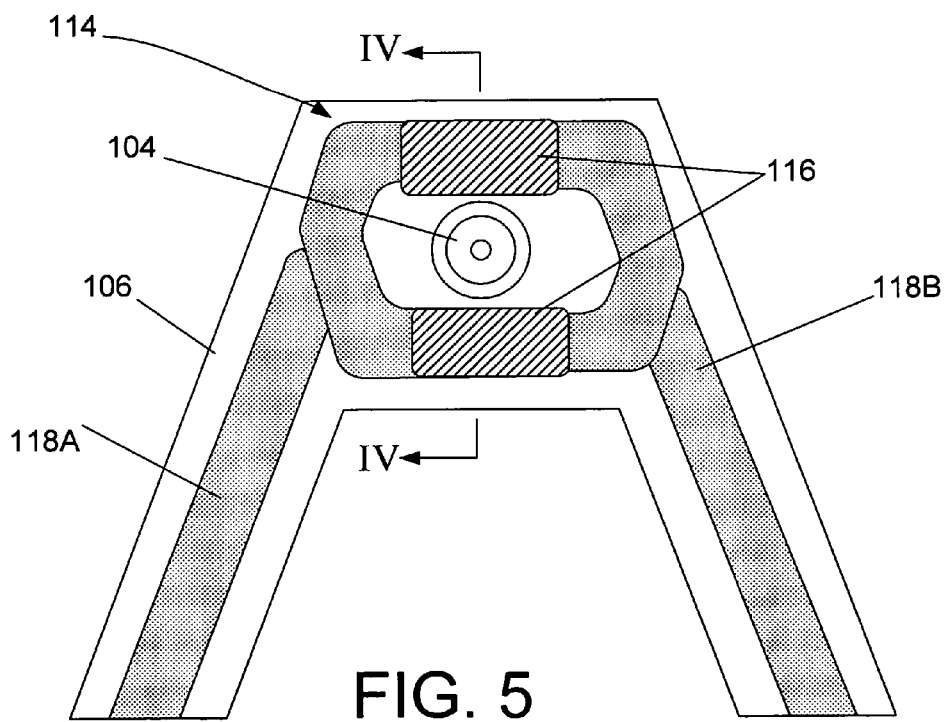
FIG. 5 is a schematic plan view as seen from under the cantilever arrangement shown in FIG. 3.

A second embodiment of the invention is shown in FIGS. 4 and 5. In this embodiment the FET 108 which is shown in FIGS. 1 and 2 is replaced with sensor elements 116 which juxtapose the medium 101 and which are circuited with the sensor circuit 110 so that a variable, which varies with the variation in the gap between the sensor elements 116 and the media 101, is monitored.

In this second embodiment, the sensor elements 116 comprise heated elements which are heated via the passage of current therethrough and thus responsive to the change in distance between the media 101 and the cantilever 106. The juxtaposed disposition of the sensing elements 116 at the end of the pod represents an improvement over the arrangements discussed in the opening paragraphs of this disclosure, in that, due to their reduced distance from the medium, the sensing elements 116 are exposed to conditions which render them more responsive in that the amount of heat which is removed from the heated elements is increased and the sensor arrangement is able to exhibit better response characteristics.

It should be noted however, that there is a limit to how close heated sensing elements can be brought to the upper surface of the medium in that the mean free path of heat flow causes the heat flux to go to zero when the air gap becomes too small.

The gaseous medium in the gap effects the minimum gap value. For example, immersing the device in an atmosphere of nitrogen, argon or other gases such as carbon dioxide or a hydrocarbon or fluorocarbon based gas, modifies the minimum gap. However, these latter mentioned gases tend to have drawbacks associated with their use which generally limit their application.

Although the invention has been disclosed with reference to a limited number of embodiments, the various modifications and variations which can be made without departing from the scope of the invention, which is limited only by the appended claims, will be self-evident to those skilled in the art of Atomic Resolution Storage (ARS) and Contact Probe Storage (CPS) technology. The provision of the pod 114 renders it possible to bring sensing elements provided in the cantilever 106 closer to the substrate and thus enable improvements in sensing sensitivity.

What is claimed is:

1. A read mechanism used in a contact atomic resolution storage system, comprising:
    a cantilever disposed with a medium which is movable relative to the cantilever, the cantilever having a probe which extends from the cantilever a first distance and which contacts a surface of the medium;
    a pod formed circumferentially about and spaced apart from the probe, the pod extending from a side of the cantilever facing the medium and defining a physical space between the pod and the probe along a portion of the first distance; and
    a sensor element formed on a distal edge of the pod opposite from the cantilever, so as to juxtapose the medium.

2. A read mechanism as set forth in claim 1, wherein the pod at least partially encloses the probe.

3. A read mechanism as set forth in claim 1, wherein the pod is essentially a continuous annular structure and surrounds at least a portion of the probe.

4. A read mechanism as set forth in claim 1, wherein the sensor element forms part of a device which is responsive to an electric field between the medium and the cantilever.

5. A read mechanism as set forth in claim 4, wherein the sensor element forms part of a FET (field effect transistor).

6. A read mechanism as set forth in claim 5, wherein the FET is a depletion mode FET.

7. A read mechanism as set forth in claim 5, wherein the FET is an enhancement mode FET.

8. A read mechanism as set forth in claim 5, wherein one of the probe and the medium is electrically non-conductive, and wherein the medium is supported on a substrate which is electrically conductive, and wherein the substrate is circuited with the FET so that variations in the electrical field which result from the distance between the medium and the cantilever changing, induces a change in electrical current passing through the FET and produces a read signal.

9. A read mechanism used in a contact atomic resolution storage system, comprising:
    a cantilever disposed with an electrically non-conductive medium which is movable relative to the cantilever, the cantilever having a probe which extends from the cantilever a first distance and which follows a topography of the medium;
    a sensor pod formed in proximity to and circumferentially about the probe, the pod extending toward the medium and defining at least one physical space between the pod and the probe along a portion of the first distance; and
    a device formed in the cantilever which responds to a change in distance between the cantilever and a substrate on which the medium is supported.

10. A read mechanism as set forth in claim 9, further comprising a sensor element formed at a leading end of the pod so as to be oriented toward the medium.

11. A read mechanism as set forth in claim 9, wherein the device is a FET and wherein the sensor element forms an operative part of the FET.

12. A method of making a read mechanism for a contact atomic resolution storage system comprising:
    forming a cantilever having a movable end;
    forming an annular sensor support extension pod on the cantilever proximate to the movable end, the pod having an edge rising above the surface of the movable end;
    forming a probe on the cantilever disposed within the annular pod and extending beyond the edge so as to have a predetermined spatial relationship with the pod;
    orienting the pod and the probe towards a medium which is movable relative to the probe and in which a data indicative topography is formed; adapting the probe to follow a data indicative topography of the medium; and
    forming a sensor element in a portion of the pod edge juxtaposed to the medium.

13. A method as set forth in claim 12, wherein the step of forming the sensor element comprises forming a FET (Field Effect Transistor) and which further comprises forming the medium on an electrically conductive substrate which is circuited with the FET to produce an electric field.

14. A method as set forth in claim 13, further comprising forming one of the probe and the medium of an electrically non-conductive material.

15. A method of using a read mechanism for a contact atomic resolution storage system comprising:
    moving a probe relative to a medium which has a data indicative topography that is followed by the probe, the probe nested within and extending beyond an upper edge of a generally concentric sensor support extension pod, the probe and the pod supported by a cantilever; and
    sensing a change in distance between the cantilever and the medium using a change in current flowing through a sensor element formed in the upper edge of the sensor support extension pod juxtaposed to the medium.

16. A method as set forth in claim 15, further comprising:
    using a FET (Field Effect Transistor) as the sensor element formed in the sensor support extension pod; and
    producing an electric field between a substrate on which the medium is supported and the cantilever.

17. A read mechanism used in a contact atomic resolution storage system comprising:
    a cantilever having a movable end disposed with a medium which is movable relative to the cantilever;
    a generally annular pod proximate to the movable end and extending from a side of the cantilever facing the medium, the pod having an edge juxtaposed to the medium;
    a pod disposed within the annular pod and extending beyond the probe edge to contact a surface of the medium; and
    a sensor element disposed within the annular pod edge.

18. A read mechanism as set forth in claim 17, wherein the pod has a uniform height.

19. A read mechanism as set forth in claim 17, wherein the pod is a generally continuous structure.

20. A read mechanism as set forth in claim 17, wherein the pod defines a physical space between the pod and the probe along a portion of the first distance.

\* \* \* \* \*

UNITED STATES PATENT AND TRADEMARK OFFICE
CERTIFICATE OF CORRECTION

PATENT NO. : 7,423,954 B2  
APPLICATION NO. : 10/736753  
DATED : September 9, 2008  
INVENTOR(S) : Robert G. Mejia Page 1 of 1

It is certified that error appears in the above-identified patent and that said Letters Patent is hereby corrected as shown below:

In column 6, line 48, in Claim 17, delete "a pod" and insert -- a probe --, therefor.

In column 6, line 49, in Claim 17, delete "probe" and insert -- pod --, therefor.

Signed and Sealed this

Sixteenth Day of June, 2009

JOHN DOLL  
*Acting Director of the United States Patent and Trademark Office*